United States Patent
Hu et al.

(10) Patent No.: US 11,339,287 B2
(45) Date of Patent: May 24, 2022

(54) RESIN COMPOSITION AND ARTICLE MADE THEREFROM

(71) Applicant: Elite Electronic Material (Zhongshan) Co., Ltd., Zhongshan (CN)

(72) Inventors: Zhilong Hu, Zhongshan (CN); Teng Xu, Zhongshan (CN); Hezong Zhang, Zhongshan (CN); Shu-Hao Chang, Taoyuan (TW)

(73) Assignee: ELITE ELECTRONIC MATERIAL (ZHONGSHAN) CO., LTD., Zhongshan (CN)

( * ) Notice: Subject to any disclaimer, the term of this patent is extended or adjusted under 35 U.S.C. 154(b) by 0 days.

(21) Appl. No.: 15/930,846

(22) Filed: May 13, 2020

(65) Prior Publication Data
US 2021/0309852 A1 Oct. 7, 2021

(30) Foreign Application Priority Data
Mar. 24, 2020 (CN) .......................... 202010212394.2

(51) Int. Cl.
*C08L 71/12* (2006.01)
*C08J 5/24* (2006.01)

(52) U.S. Cl.
CPC ............... *C08L 71/126* (2013.01); *C08J 5/24* (2013.01); *C08L 2203/20* (2013.01); *C08L 2205/035* (2013.01)

(58) Field of Classification Search
CPC ........ C08L 71/126; B32B 27/285; C08J 5/24; C08K 5/0066; C08K 5/0025
See application file for complete search history.

(56) References Cited

U.S. PATENT DOCUMENTS

| | | | | |
|---|---|---|---|---|
| 2001/0053830 A1* | 12/2001 | Yokoyama | ............... | G02B 1/04 526/82 |
| 2016/0145370 A1* | 5/2016 | Kitai | ................... | C08F 290/062 428/196 |
| 2017/0342200 A1* | 11/2017 | Hong | ..................... | C08F 36/20 |

FOREIGN PATENT DOCUMENTS

CN 103172998 A * 6/2013
JP 06172470 A * 6/1994

OTHER PUBLICATIONS

Machine Translation of CN 103172998 A https://patents.google.com/patent/CN103172998A/en?oq=cn103172998 (Year: 2021).*
Machine Translation of JP 06172470 A http://translationportal.epo.org/emtp/translate/?ACTION=description-retrieval&COUNTRY=JP&ENGINE=google&FORMAT=docdb&KIND=A&LOCALE=en_EP&NUMBER=H06172470&OPS=ops.epo.org/3.2&SRCLANG=ja&TRGLANG=en (Year: 2021).*

* cited by examiner

*Primary Examiner* — Callie E Shosho
*Assistant Examiner* — Bethany M Miller
(74) *Attorney, Agent, or Firm* — Muncy, Geissler, Olds & Lowe, P.C.

(57) ABSTRACT

A resin composition includes 100 parts by weight of a vinyl-containing polyphenylene ether resin and 45 parts by weight to 75 parts by weight of an inorganic filler combination, wherein the inorganic filler combination at least includes chemically synthesized silica and silicon nitride, and a weight ratio of the chemically synthesized silica and the silicon nitride is between 1:2 and 5:2. The resin composition or an article made therefrom may achieve improvement in at least one of the following properties: dielectric constant, dissipation factor, peel strength, soldering resistance, T300 thermal resistance, laminate appearance, sedimentation property, water absorption rate, and ratio of thermal expansion.

15 Claims, 2 Drawing Sheets

RESIN COMPOSITION AND ARTICLE MADE THEREFROM

CROSS-REFERENCE TO RELATED APPLICATION

This application claims the priority benefits of China Patent Application No. 202010212394.2, filed on Mar. 24, 2020, the entirety of which is hereby incorporated by reference herein and made a part of this specification.

BACKGROUND

1. Field of the Disclosure

The present disclosure mainly relates to a resin composition and more particularly to a resin composition comprising a vinyl-containing polyphenylene ether resin and an inorganic filler combination, which is useful for preparing an article such as a prepreg, a resin film, a laminate or a printed circuit board.

2. Description of Related Art

Low dielectric resin materials are important base materials in the electronic industry and are widely used in various servers, large base stations, cloud equipment and other electronic products.

Recently, the electronic technology has been developed towards high density, lower power consumption and higher performance, thereby presenting more challenges to the high performance electronic materials. Higher interconnection and integration density per unit area of electronic devices results in greater heat generation during the operation of the devices, which requires higher thermal resistance of the low dielectric resin materials and higher peel strength of the materials. To improve the quality and yield rate of circuit boards, good laminate appearance and processability of laminates are both necessary. Therefore, in order to increase the mechanical strength and thermal conductivity of laminates, inorganic fillers are added to the resin composition; however, sedimentation of conventional inorganic fillers occurs easily in the resin composition and causes unstable quality of laminates, and the sedimentation property of the resin composition is therefore a major concern in this field to ensure the stability of the material quality. Meanwhile, it is desirable for the material to have sufficiently low water absorption rate to ensure better peel strength and electric properties. To realize transmission of big data, transmission speed of electronic information needs to be fast, and information transmission needs to be complete without signal loss; therefore, the materials also need to have low dissipation factor and low dielectric constant to meet the demands of growing amount of electronic information data.

SUMMARY

To overcome the problems of prior arts, particularly one or more above-mentioned technical problems facing conventional materials, it is a primary object of the present disclosure to provide a resin composition and an article made therefrom which may overcome at least one of the above-mentioned technical problems.

Specifically, the resin composition disclosed herein or the article made therefrom achieves improvement in one or more of the following properties: dielectric constant, dissipation factor, peel strength (e.g., copper foil peeling strength), soldering resistance, T300 thermal resistance, laminate appearance, sedimentation property, water absorption rate, and ratio of thermal expansion.

To achieve the above-mentioned object, the present disclosure provides a resin composition, comprising 100 parts by weight of a vinyl-containing polyphenylene ether resin and 45 parts by weight to 75 parts by weight of an inorganic filler combination, the inorganic filler combination at least comprising chemically synthesized silica and silicon nitride, wherein a weight ratio of the chemically synthesized silica and the silicon nitride is between 1:2 and 5:2.

In one embodiment, the vinyl-containing polyphenylene ether resin comprises a vinylbenzyl-containing polyphenylene ether resin, a methacrylate-containing polyphenylene ether resin, a chain-extended vinyl-containing polyphenylene ether resin, an allyl-containing polyphenylene ether resin or a combination thereof.

In one embodiment, the chemically synthesized silica comprises spherical silica having a particle size of between 0.5 and 4.5 μm.

In one embodiment, the chemically synthesized silica comprises microemulsion synthesized silica, vaporized metal combustion synthesized silica or a combination thereof.

In one embodiment, the silicon nitride comprises irregular silicon nitride having a particle size of between 0.5 and 12 μm.

In one embodiment, the resin composition further comprises an additive combination or a prepolymer thereof, and the additive combination at least comprises divinylbenzene, triallyl compound and diallyl isophthalate. For example, in the additive combination, the divinylbenzene, the triallyl compound and the diallyl isophthalate are present in a weight ratio of 10-20:10-20:5-15.

In one embodiment, the resin composition comprises 10 to 35 parts by weight of the additive combination or the prepolymer thereof relative to 100 parts by weight of the vinyl-containing polyphenylene ether resin. In another embodiment, the resin composition comprises 10 to 30 parts by weight of the prepolymer of the additive combination relative to 100 parts by weight of the vinyl-containing polyphenylene ether resin.

In one embodiment, the additive combination further comprises maleimide resin, styrene maleic anhydride, 1,2,4-trivinyl cyclohexane, styrene, polyolefin, epoxy resin, cyanate ester resin, maleimide triazine resin, phenolic resin, benzoxazine resin, polyester resin, amine curing agent or a combination thereof.

In one embodiment, the resin composition further comprises divinylbenzene, triallyl compound, di(vinylphenyl) ethane, di(vinylphenyl)hexane, diallyl isophthalate, bis(vinylphenyl) dimethyl ether, bis(vinylphenyl) dimethyl benzene, maleimide resin, polyolefin resin, cyanate ester resin, maleimide triazine resin, epoxy resin, phenolic resin, benzoxazine resin, styrene maleic anhydride resin, polyester resin, amine curing agent, polyamide resin, polyimide resin or a combination thereof.

In one embodiment, the resin composition further comprises filler, flame retardant, curing accelerator, polymerization inhibitor, coloring agent, toughening agent, silane coupling agent, solvent or a combination thereof.

In one embodiment, the resin composition has a sedimentation property of greater than or equal to 28 minutes, such as between 28 minutes and 60 minutes, such as greater than or equal to 30 minutes, such as between 30 minutes and 60 minutes.

In another aspect, the present disclosure provides an article made from the resin composition described above, which comprises a prepreg, a resin film, a laminate or a printed circuit board.

In one embodiment, articles made from the resin composition disclosed herein have one, more or all of the following properties:
- a dissipation factor as measured by reference to JIS C2565 at 10 GHz of less than or equal to 0.0040, such as less than or equal to 0.0035, or such as between 0.0032 and 0.0039 or between 0.0032 and 0.0035;
- a dielectric constant as measured by reference to JIS C2565 at 10 GHz of less than or equal to 3.30, such as less than or equal to 3.24, or such as between 3.08 and 3.29 or between 3.16 and 3.24;
- a copper foil peeling strength as measured by reference to IPC-TM-650 2.4.8 of greater than or equal to 3.26 lb/in, such as between 3.26 lb/in and 3.65 lb/in, between 3.26 lb/in and 3.55 lb/in or between 3.31 lb/in and 3.55 lb/in;
- a water absorption rate as measured by reference to IPC-TM-650 2.6.2.1a of less than or equal to 0.15%, such as less than or equal to 0.09%, such as between 0.06% and 0.15% or between 0.06% and 0.09%;
- a Z-axis ratio of thermal expansion as measured by reference to IPC-TM-650 2.4.24.5 of less than or equal to 2.66%, such as between 2.14% and 2.66%, between 2.48% and 2.66% or between 2.48% and 2.59%;
- no delamination occurs after subjecting the article to a soldering resistance test of greater than or equal to 18 cycles by reference to IPC-650 2.4.23, such as no delamination occurs after 20 or more cycles, such as between 20 and 30 cycles;
- a time to delamination as measured by using a thermomechanical analyzer by reference to IPC-TM-650 2.4.24.1 at 300° C. of greater than or equal to 100 minutes, such as between 100 minutes and 150 minutes or between 100 minutes and 120 minutes; and no dry board on laminate surface as observed by naked eyes, such as no weave exposure on laminate surface by visual inspection.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "includes," "including," "encompass," "has," "having" or any other variant thereof is construed as an open-ended transitional phrase intended to cover a non-exclusive inclusion. For example, a composition or manufacture that comprises a list of elements is not necessarily limited to only those elements but may include other elements not expressly listed or inherent to such composition or manufacture.

Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "encompass," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Similarly, a range of "between 1 and 8" should be understood as explicitly disclosing all ranges such as 1 to 8, 1 to 7, 2 to 8, 2 to 6, 3 to 6, 4 to 8, 3 to 8 and so on and encompassing the end points of the ranges. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$" and Y is described as being "selected from a group consisting of $Y_1$, $Y_2$ and $Y_3$," the disclosure includes any combination of X is $X_1$ and/or $X_2$ and/or $X_3$ and Y is $Y_1$ and/or $Y_2$ and/or $Y_3$.

As used herein, part(s) by weight represents weight part(s) in any weight unit, such as but not limited to kilogram, gram, pound and so on. For example, 100 parts by weight of a vinyl-containing polyphenylene ether resin may represent 100 kilograms of the vinyl-containing polyphenylene ether resin or 100 pounds of the vinyl-containing polyphenylene ether resin.

The following embodiments and examples are illustrative in nature and are not intended to limit the present disclosure and its application. In addition, the present disclosure is not bound by any theory described in the background and summary above or the following embodiments or examples.

As used herein, "or a combination thereof" means "or any combination thereof".

Unless otherwise specified, according to the present disclosure, a resin may include a compound and/or a mixture. A compound may include a monomer and/or a polymer. A mixture may include two or more compounds and may include a copolymer or auxiliaries, but not limited thereto.

For example, a compound refers to a chemical substance formed by two or more elements bonded with chemical bonds and may be present as a monomer, a polymer, etc., but not limited thereto. A monomer refers to a compound which may participate in a polymerization or prepolymerization reaction to produce a high molecular weight compound. A homopolymer refers to a chemical substance formed by a single compound via polymerization, addition polymerization or condensation polymerization, and a copolymer refers to a chemical substance formed by two or more compounds via polymerization, addition polymerization or condensation polymerization, but not limited thereto. In addition, as used herein, the term "polymer" includes but is not limited to an oligomer. An oligomer refers to a polymer with 2 to 20, typically 2 to 5, repeating units.

As described above, the present disclosure primarily aims to provide a resin composition, comprising: 100 parts by weight of a vinyl-containing polyphenylene ether resin; and 45 parts by weight to 75 parts by weight of an inorganic filler combination, the inorganic filler combination at least comprising chemically synthesized silica and silicon nitride, wherein a weight ratio of the chemically synthesized silica and the silicon nitride is between 1:2 and 5:2.

For example, according to the present disclosure, the vinyl-containing polyphenylene ether resin refers to a polyphenylene ether compound or mixture having an ethylenic carbon-carbon double bond (C=C) or a functional group derived therefrom, examples thereof including but not limited to the presence of a vinyl group, an allyl group, a vinylbenzyl group, a methacrylate group or the like in its structure. Unless otherwise specified, the position of the aforesaid functional group is not particularly limited and may be located at the terminal of a long-chain structure. In other words, the vinyl-containing polyphenylene ether resin described herein represents a polyphenylene ether resin containing a reactive vinyl group or a functional group derived therefrom, examples including but not limited to a polyphenylene ether resin containing a vinyl group, an allyl group, a vinylbenzyl group, or a methacrylate group.

For example, in one embodiment, the vinyl-containing polyphenylene ether resin described herein comprises a vinylbenzyl-containing polyphenylene ether resin, a methacrylate-containing polyphenylene ether resin (i.e., methacryl-containing polyphenylene ether resin), a chain-extended vinyl-containing polyphenylene ether resin, an allyl-containing polyphenylene ether resin or a combination thereof.

For example, the vinyl-containing polyphenylene ether resin may be SA9000 available from Sabic, a vinylbenzyl-containing polyphenylene ether resin with a number average molecular weight of about 1200 (such as OPE-2st 1200, available from Mitsubishi Gas Chemical Co., Inc.), a vinylbenzyl-containing polyphenylene ether resin with a number average molecular weight of about 2200 (such as OPE-2st 2200, available from Mitsubishi Gas Chemical Co., Inc.), a vinylbenzyl-modified bisphenol A polyphenylene ether resin with a number average molecular weight of about 2400 to 2800, a chain-extended vinyl-containing polyphenylene ether resin with a number average molecular weight of about 2200 to 3000, or a combination thereof. The chain-extended vinyl-containing polyphenylene ether resin may include various polyphenylene ether resins disclosed in the US Patent Application Publication No. 2016/0185904 A1, all of which are incorporated herein by reference in their entirety.

In addition, for example, the vinyl-containing polyphenylene ether resin may comprise a structure of Formula (A):

Formula (A)

wherein b1 is an integer of 0 to 10, preferably an integer of 0 to 5;

$Q_1$ comprises a structure of any one of Formula (A-1) to Formula (A-3):

Formula (A-1)

Formula (A-2)

Formula (A-3)

$Y_1$ and $Y_2$ independently comprise a structure of Formula (A-4):

Formula (A-4)

In Formula (A-4), m1 and n1 independently represent an integer of 1 to 15, such as 1, 5, 10 or 15; $R_1$ to $R_{16}$ are independently selected from H, —$CH_3$ and a halogen atom (e.g., chlorine); $A_1$ is selected from a covalent bond, —$CH_2$—, —$CH(CH_3)$—, —$C(CH_3)_2$—, —O—, —S—, —$SO_2$— and a carbonyl group;

$Z_1$ and $Z_2$ independently comprise a structure of Formula (A-5), Formula (A-6) or Formula (A-7):

Formula (A-5)

Formula (A-6)

Formula (A-7)

In Formula (A-5), $R_{17}$ to $R_{23}$ are individually selected from H, —$CH_3$ and a halogen atom, and W1 is a $C_1$-$C_3$ divalent aliphatic group, such as methylene, ethylene, or propylene. In Formula (A-6), $R_{47}$ to $R_{49}$ are individually selected from H, —$CH_3$ and a halogen atom, and Q is a $C_1$-$C_3$ divalent aliphatic group, such as methylene, ethylene, or propylene.

For example, the vinyl-containing polyphenylene ether resin may comprise a structure below:

wherein m3 and n3 independently represent an integer of 1 to 15; $R_{50}$ to $R_{65}$ are independently selected from H, —$CH_3$ and a halogen atom; and $A_3$ is selected from a covalent bond, —$CH_2$—, —$CH(CH_3)$—, —$C(CH_3)_2$—, —O—, —S—, —$SO_2$— and a carbonyl group.

In one embodiment, relative to 100 parts by weight of the vinyl-containing polyphenylene ether resin, the resin composition disclosed herein comprises 45 parts by weight to 75 parts by weight of the inorganic filler combination, such as 50 parts by weight, 60 parts by weight or 70 parts by weight of the inorganic filler combination.

The inorganic filler combination at least comprises chemically synthesized silica and silicon nitride, and a weight ratio of the chemically synthesized silica and the silicon nitride is between 1:2 and 5:2. For example, the weight ratio of the chemically synthesized silica and the silicon nitride may be 1:2, 1:1, 7:5, 2:1 or 5:2, but not limited thereto.

Unless otherwise specified, the chemically synthesized silica refers to the silica obtained by a chemical synthesis process, which generally involves subjecting a silicon source and other reactants to a chemical reaction under properly controlled conditions so as to obtain the chemically synthesized silica. For example, the chemically synthesized silica may comprise microemulsion synthesized silica, vaporized metal combustion synthesized silica or a combination thereof, but not limited thereto. Other synthesis steps and conditions suitable for preparing the chemically synthesized silica of the present disclosure may be ascertained by a skilled person in the art without undue experimentation.

In one embodiment, the chemically synthesized silica is a microemulsion synthesized silica. In one embodiment, the microemulsion process involves, without limitation to, adding a silicon source (such as but not limited to silanol and silicate (such as tetraethoxysilane $Si(OC_2H_5)_4$, tetramethoxysilane, tetrapropoxysilane and so on)) to a microemulsion system formed by surfactant (such as but not limited to mono-4-nonylphenyl ether, as shown below, sodium alkyl sulfate, alkyl trimethyl ammonium chloride, alkyl dimethylammonium acetate salt, polyoxyethylene alkyl ether, bis (2-ethylhexyl) sulfosuccinate sodium, sodium dodecyl sulfate, sodium hexadecyl sulfonate, hexadecyl trimethyl ammonium bromide, polyoxyethylene ether, etc.), solvent (such as but not limited to $C_6$-$C_8$ straight-chain hydrocarbon or cyclic alkane, such as cyclohexane oxide, cyclohexane, etc.) and water, such that the oriented arrangement of silicon atoms and hydrophilic groups and lipophilic groups in the surfactant molecules forms micelle or microemulsion droplets which may then be dried to obtain the chemically synthesized silica.

Mono-4-nonylphenyl ether:

In one embodiment, the chemically synthesized silica is preferably spherical silica. For example, the particle size is between 0.5 and 4.5 μm, preferably between 0.5 and 4.0 μm, more preferably between 0.6 and 3.0 μm. For example, the D50 is less than or equal to 2.0 μm, and the D99 is less than or equal to 4.0 μm. For example, the specific gravity is between 2.1 g/cm³ and 2.3 g/cm³. For example, the pH value is between 4.5 and 6.5.

Unless otherwise specified, the particle size refers to a range of particle size distribution of the inorganic filler (such as but not limited to the chemically synthesized silica)

measured by laser scattering, D50 refers to the particle size of the inorganic filler (such as but not limited to the chemically synthesized silica) when the cumulative volume percentage reaches 50%, and D99 refers to the particle size of the inorganic filler (such as but not limited to the chemically synthesized silica) when the cumulative volume percentage reaches 99%.

In one embodiment, the chemically synthesized silica is a vaporized metal combustion (VMC method) synthesized silica. The vaporized metal combustion method involves, without limitation to, a process of preparing fine spherical oxide microparticles by the explosive combustion of metal or metalloid powder; specifically, silicon metal or metalloid powder may be dispersed in oxygen stream and oxidized after ignition such that heat of reaction converts the powder and oxide into vapor or liquid which may then be cooled to form the fine particles of chemically synthesized silica.

In one embodiment, the vaporized metal combustion synthesized silica is preferably spherical in shape and has a D50 of 0.4 μm to 0.6 μm, a specific surface area of 5.0 $m^2/g$ to 7.5 $m^2/g$, and a purity of having a silica content of greater than or equal to 99.8%.

For example, the chemically synthesized silica may be the spherical silica purchased from Suzhou Jinyi New Materials Technology Co., Ltd., but not limited thereto.

In one embodiment, the source of the silicon nitride is not particularly limited and may comprise such as irregular silicon nitride. For example, the silicon nitride may have a particle size of between 0.50 and 12.00 μm, preferably between 0.50 and 7.14 μm. For example, its D50 is less than or equal to 4.50 μm, and its D90 is less than or equal to 7.14 μm, wherein D90 refers to the particle size of the inorganic filler (such as but not limited to the silicon nitride) when the cumulative volume percentage reaches 90%. For example, it may have a specific surface area of about 1.39 $m^2/g$, an electric conductivity of about 16.00 us/cm, an alumina content of about 188 ppm, and an iron oxide content of about 19.72 ppm.

For example, the silicon nitride may be available under the tradename VF-TG16 purchased from Huzhou Jingxi Powder Material Co., Ltd., but not limited thereto.

In one embodiment, in addition to the vinyl-containing polyphenylene ether resin and the inorganic filler combination, the resin composition disclosed herein may optionally further comprise an additive combination or a prepolymer thereof.

For example, the additive combination may be a mixture containing multiple additives and may be a prepolymer obtained by subjecting the additive combination to prepolymerization.

According to the present disclosure, prepolymerization refers to the process of prepolymerizing one, two or more chemical substances to obtain a prepolymer.

For example, in one embodiment, the additive combination may at least comprise divinylbenzene, triallyl compound, and diallyl isophthalate. In one embodiment, the prepolymer of the additive combination is obtained by prepolymerizing divinylbenzene, triallyl compound and diallyl isophthalate.

In one embodiment, the divinylbenzene comprises an ortho-divinylbenzene, a para-divinylbenzene, a meta-divinylbenzene or a combination thereof.

In one embodiment, the triallyl compound comprises triallyl isocyanurate (TAIC), triallyl cyanurate (TAC) or a combination thereof.

In at least one embodiment, for example but not limited thereto, the additive combination is subjected to prepolymerization in the presence of a peroxide at 60-120° C. for 1-4 hours, followed by filtration and purification to obtain the prepolymer of the additive combination.

In at least one embodiment, for example but not limited thereto, any divinylbenzene described above, any triallyl compound described above and the diallyl isophthalate described above are subjected to prepolymerization in the presence of a peroxide at 60-120° C. for 1-4 hours, followed by filtration and purification to obtain the prepolymer of the additive combination.

In one embodiment for example, the prepolymerization described in the present disclosure refers to a conversion rate of the divinylbenzene of greater than 0% and less than 100% (exclusive of 0% and 100%), a conversion rate of the triallyl compound of greater than 0% and less than 100% (exclusive of 0% and 100%), and a conversion rate of the diallyl isophthalate of greater than 0% and less than 100% (exclusive of 0% and 100%), i.e., the overall conversion rate of the divinylbenzene, the triallyl compound and the diallyl isophthalate being of greater than 0% and less than 100% (exclusive of 0% and 100%). In one embodiment, the overall conversion rate of the divinylbenzene, the triallyl compound and the diallyl isophthalate is between 10% and 90%.

In one embodiment, in the additive combination or the prepolymer thereof, the divinylbenzene, the triallyl compound and the diallyl isophthalate are present in a weight ratio of 10-20:10-20:5-15. For example, the weight ratio of the divinylbenzene, the triallyl compound and the diallyl isophthalate may be 10:10:5, 20:10:5, 10:20:5, 10:10:15 or 15:15:10, but not limited thereto.

In one embodiment, in the resin composition disclosed herein, relative to 100 parts by weight of the vinyl-containing polyphenylene ether resin, the resin composition further comprises 10 parts by weight to 35 parts by weight of the additive combination or a prepolymer thereof, and preferably the resin composition further comprises 10 parts by weight to 35 parts by weight of the prepolymer of the additive combination.

In one embodiment, in the resin composition disclosed herein, relative to 100 parts by weight of the vinyl-containing polyphenylene ether resin, the resin composition further comprises 10 parts by weight to 30 parts by weight of the prepolymer of the additive combination.

In one embodiment, the additive combination or a prepolymer thereof may further optionally comprise maleimide resin, styrene maleic anhydride, 1,2,4-trivinyl cyclohexane, styrene, polyolefin, epoxy resin, cyanate ester resin, maleimide triazine resin, phenolic resin, benzoxazine resin, polyester resin, amine curing agent or a combination thereof.

For example, the additive combination or a prepolymer thereof may comprise divinylbenzene, triallyl compound, diallyl isophthalate and maleimide resin.

For example, the additive combination or a prepolymer thereof may comprise divinylbenzene, triallyl compound, diallyl isophthalate and polyolefin.

For example, the additive combination or a prepolymer thereof may comprise divinylbenzene, triallyl compound, diallyl isophthalate and amine curing agent.

In one embodiment, in addition to the vinyl-containing polyphenylene ether resin and the inorganic filler combination, the resin composition disclosed herein may further optionally comprise divinylbenzene, triallyl compound, di(vinylphenyl)ethane, di(vinylphenyl)hexane, diallyl isophthalate, bis(vinylphenyl) dimethyl ether, bis(vinylphenyl) dimethyl benzene, maleimide resin, polyolefin resin, cyanate ester resin, maleimide triazine resin, epoxy resin, phenolic resin, benzoxazine resin, styrene maleic anhydride resin, polyester resin, amine curing agent, polyamide resin, polyimide resin or a combination thereof.

For example, the maleimide resin used herein refers to a compound or a mixture containing at least one maleimide group. Unless otherwise specified, the maleimide resin used in the present disclosure is not particularly limited and may include any one or more maleimide resins useful for preparing a prepreg, a resin film, a laminate or a printed circuit board. Examples include but are not limited to 4,4'-diphenylmethane bismaleimide, oligomer of phenylmethane maleimide, m-phenylene bismaleimide, bisphenol A diphenyl ether bismaleimide, 3,3'-dimethyl-5,5'-diethyl-4,4'-diphenyl methane bismaleimide, 4-methyl-1,3-phenylene bismaleimide, 1,6-bismaleimide-(2,2,4-trimethyl)hexane, N-2,3-xylyl maleimide, N-2,6-xylylmaleimide, N-phenylmaleimide, maleimide resin containing aliphatic long-chain structure or a combination thereof. In addition, unless otherwise specified, the aforesaid maleimide resin of the present disclosure may also comprise a prepolymer thereof, such as a prepolymer of diallyl compound and maleimide resin, a prepolymer of diamine and maleimide resin, a prepolymer of multi-functional amine and maleimide resin or a prepolymer of acid phenol compound and maleimide resin, but not limited thereto.

For example, the maleimide resin may include products such as BMI-1000, BMI-1000H, BMI-1100, BMI-1100H, BMI-2000, BMI-2300, BMI-3000, BMI-3000H, BMI-4000H, BMI-5000, BMI-5100, BM-7000 and BMI-7000H available from Daiwakasei Industry Co., Ltd., products such as BMI-70 and BMI-80 available from K.I Chemical Industry Co., Ltd, or products such as D928, D930, D932, D934, D936, D937 and D938 available from Sichuan EM Technology Co., Ltd.

For example, the maleimide resin containing aliphatic long-chain structure may include products such as BMI-689, BMI-1400, BMI-1500, BMI-1700, BMI-2500, BMI-3000, BMI-5000 and BMI-6000 available from Designer Molecules Inc.

For example, the polyolefin resin described herein may include any one or more polyolefin resins useful for preparing a prepreg, a resin film, a laminate or a printed circuit board. Examples include but are not limited to styrene-butadiene-divinylbenzene terpolymer, styrene-butadiene-maleic anhydride terpolymer, vinyl-polybutadiene-urethane oligomer, styrene butadiene copolymer, hydrogenated styrene butadiene copolymer, styrene isoprene copolymer, hydrogenated styrene isoprene copolymer, methylstyrene homopolymer, petroleum resin, cycloolefin copolymer and a combination thereof.

The cyanate ester resin described herein may include any known cyanate ester resins used in the art, including but not limited to a cyanate ester resin with an Ar—O—C≡N structure (wherein Ar represents an aromatic group, such as benzene, naphthalene or anthracene), a phenol novolac cyanate ester resin, a bisphenol A cyanate ester resin, a bisphenol A novolac cyanate ester resin, a bisphenol F cyanate ester resin, a bisphenol F novolac cyanate ester resin, a dicyclopentadiene-containing cyanate ester resin, a naphthalene-containing cyanate ester resin, a phenolphthalein cyanate ester resin, or a combination thereof. Examples of the cyanate ester resin include but are not limited to Primaset PT-15, PT-30S, PT-60S, BA-200, BA-230S, BA-3000S, BTP-2500, BTP-6020S, DT-4000, DT-7000, ULL950S, HTL-300, CE-320, LVT-50, or LeCy available from Lonza.

For example, unless otherwise specified, the maleimide triazine resin described in the present disclosure is not particularly limited and may include any one or more maleimide triazine resins useful for preparing a prepreg, a resin film, a laminate or a printed circuit board. For example, the maleimide triazine resin may be obtained by polymerizing the aforesaid cyanate ester resin and the aforesaid maleimide resin. The maleimide triazine resin may be obtained by polymerizing bisphenol A cyanate ester and maleimide resin, by polymerizing bisphenol F cyanate ester and maleimide resin, by polymerizing phenol novolac cyanate ester and maleimide resin or by polymerizing dicyclopentadiene-containing cyanate ester and maleimide resin, but not limited thereto.

For example, the maleimide triazine resin may be obtained by polymerizing the cyanate ester resin and the maleimide resin at any molar ratio. For example, relative to 1 mole of the maleimide resin, 1 to 10 moles of the cyanate ester resin may be used. For example, relative to 1 mole of the maleimide resin, 1, 2, 4, or 6 moles of the cyanate ester resin may be used, but not limited thereto.

For example, the epoxy resin described herein may be any epoxy resins known in the field to which this disclosure pertains, including but not limited to bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional novolac epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, isocyanate-modified epoxy resin, or a combination thereof. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin. The phosphorus-containing epoxy resin may be DOPO (9,10-dihydro-9-oxa-10-phosphaphenanthrene-10-oxide) epoxy resin, DOPO-HQ epoxy resin or a combination thereof. The DOPO epoxy resin may be any one or more selected from DOPO-containing phenolic novolac epoxy resin, DOPO-containing cresol novolac epoxy resin and DOPO-containing bisphenol-A novolac epoxy resin; the DOPO-HQ epoxy resin may be any one or more selected from DOPO-HQ-containing phenolic novolac epoxy resin, DOPO-HQ-containing cresol novolac epoxy resin and DOPO-HQ-containing bisphenol-A novolac epoxy resin.

For example, the phenolic resin described herein may be a mono-functional, bifunctional or multi-functional phenolic resin. The type of the phenolic resin is not particularly limited and may include those currently used in the field to which this disclosure pertains. Preferably, the phenolic resin is selected from a phenoxy resin, a novolac resin or a combination thereof.

For example, the benzoxazine resin described herein may include bisphenol A benzoxazine resin, bisphenol F benzoxazine resin, phenolphthalein benzoxazine resin, dicyclopentadiene benzoxazine resin, or phosphorus-containing benzoxazine resin, such as but not limited to LZ-8270 (phenolphthalein benzoxazine resin), LZ-8280 (bisphenol F benzoxazine resin), and LZ-8290 (bisphenol A benzoxazine resin) available from Huntsman or HFB-2006M available from Showa High Polymer.

For example, the styrene maleic anhydride resin described herein may have a ratio of styrene (S) to maleic anhydride (MA) of 1:1, 2:1, 3:1, 4:1, 6:1, or 8:1, examples including but not limited to styrene maleic anhydride copolymers such as SMA-1000, SMA-2000, SMA-3000, EF-30, EF-40, EF-60 and EF-80 available from Cray Valley, or styrene maleic anhydride copolymers such as C400, C500, C700 and C900 available from Polyscope. Additionally, the styrene maleic anhydride resin may also be an esterified styrene maleic anhydride copolymer, such as esterified styrene maleic anhydride copolymers SMA1440, SMA17352, SMA2625, SMA3840 and SMA31890 available from Cray Valley. Unless otherwise specified, the styrene maleic anhydride resin can be added individually or as a combination to the resin composition of this disclosure.

For example, the polyester resin described herein may be obtained by esterification of an aromatic compound with two carboxylic groups and an aromatic compound with two hydroxyl groups, such as but not limited to HPC-8000, HPC-8150 or HPC-8200 available from DIC Corporation.

For example, the amine curing agent described herein may be dicyandiamide, diamino diphenyl sulfone, diamino diphenyl methane, diamino diphenyl ether, diamino diphenyl sulfide or a combination thereof, but not limited thereto.

For example, the polyamide resin described herein may be any polyamide resins known in the field to which this disclosure pertains, including but not limited to various commercially available polyamide resin products.

For example, the polyimide resin described herein may be any polyimide resins known in the field to which this disclosure pertains, including but not limited to various commercially available polyimide resin products.

In one embodiment, in addition to the vinyl-containing polyphenylene ether resin and the inorganic filler combination, the resin composition disclosed herein may optionally further comprise filler, flame retardant, curing accelerator, polymerization inhibitor, coloring agent, toughening agent, silane coupling agent, solvent or a combination thereof.

In one embodiment, for example, the filler used herein may be any one or more fillers used for preparing a resin film, a prepreg, a laminate or a printed circuit board; examples include but are not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride, and calcined kaolin. Moreover, the filler can be spherical, fibrous, plate-like, particulate, sheet-like or whisker-like and can be optionally pretreated by a silane coupling agent.

For example, the flame retardant used herein may be any one or more flame retardants useful for preparing a prepreg, a resin film, a laminate or a printed circuit board; examples of the flame retardant include but are not limited to a phosphorus-containing flame retardant, such as any one, two or more selected from the following group: ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO and its derivatives or resins, diphenylphosphine oxide (DPPO) and its derivatives or resins, melamine cyanurate, tri-hydroxy ethyl isocyanurate, aluminium phosphinate (e.g., commercially available OP-930 and OP-935), or a combination thereof.

For example, the flame retardant used herein may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN), and a DOPO-containing epoxy resin, etc., wherein DOPO-PN is a DOPO-containing phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) or DOPO-BPSN (DOPO-bisphenol S novolac), etc.

In one embodiment, for example, the curing accelerator (including curing initiator) suitable for the present disclosure may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butylperoxy)-3-hexyne (25B), bis(tert-butylperoxyisopropyl) benzene or a combination thereof.

For example, the polymerization inhibitor is not particularly limited and may be any polymerization inhibitor known in the field to which this disclosure pertains, including but not limited to various commercially available polymerization inhibitor products. For example, the polymerization inhibitor may comprise, but not limited to, 1,1-diphenyl-2-picrylhydrazyl radical, methyl acrylonitrile, dithioester, nitroxide-mediated radical, triphenylmethyl radical, metal ion radical, sulfur radical, hydroquinone, 4-methoxyphenol, p-benzoquinone, phenothiazine, β-phenylnaphthyl amine, 4-t-butylcatechol, methylene blue, 4,4'-butylidenebis(6-t-butyl-3-methylphenol), 2,2'-methylenebis (4-ethyl-6-t-butylphenol) or a combination thereof.

For example, the nitroxide-mediated radical may comprise, but not limited to, nitroxide radicals derived from cyclic hydroxylamines, such as 2,2,6,6-substituted piperidine 1-oxyl free radical, 2,2,5,5-substituted pyrrolidine 1-oxyl free radical or the like. Preferred substitutes include alkyl groups with 4 or fewer carbon atoms, such as methyl group or ethyl group. Examples of the compound containing a nitroxide radical include such as 2,2,6,6-tetramethylpiperidine 1-oxyl free radical, 2,2,6,6-tetraethyl piperidine 1-oxyl free radical, 2,2,6,6-tetramethyl-4-oxo-piperidine 1-oxyl free radical, 2,2,5,5-tetramethylpyrrolidine 1-oxyl free radical, 1,1,3,3-tetramethyl-2-isoindoline oxygen radical, N,N-di-tert-butylamine oxygen free radical and so on. Nitroxide radicals may also be replaced by using stable radicals such as galvinoxyl radicals.

The polymerization inhibitor suitable for the resin composition of the present disclosure may include products derived from the polymerization inhibitor with its hydrogen atom or group substituted by other atom or group. Examples include products derived from a polymerization inhibitor with its hydrogen atom substituted by an amino group, a hydroxyl group, a carbonyl group or the like.

For example, the coloring agent may comprise but is not limited to dye or pigment.

For example, the purpose of adding toughening agent is to improve the toughness of the resin composition. The toughening agent may comprise, but not limited to, carboxyl-terminated butadiene acrylonitrile rubber (CTBN rubber), core-shell rubber, or a combination thereof.

For example, the silane coupling agent used herein may comprise silane (such as but not limited to siloxane) and may be further categorized according to the functional groups into amino silane compound, epoxide silane compound, vinylsilane compound, acrylate silane compound, methacrylate silane compound, hydroxylsilane compound, isocyanate silane compound, methacryloxy silane compound and acryloxy silane compound.

In one embodiment, for example, the purpose of adding solvent is to change the solid content of the resin composition and to adjust the viscosity of the resin composition. For example, the solvent may comprise, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof.

The resin composition of various embodiments may be processed to make different articles, such as those suitable for use as components in electronic products, including but not limited to a prepreg, a resin film, a laminate or a printed circuit board.

For example, the resin composition from each embodiment of this disclosure can be used to make a prepreg, which comprises a reinforcement material and a layered structure disposed thereon. The layered structure is formed by heating the resin composition at a high temperature to the semi-cured state (B-stage). Suitable baking temperature for making the prepreg is 80° C. to 200° C. The reinforcement material may be any one of a fiber material, woven fabric, and non-woven fabric, and the woven fabric preferably comprises fiberglass fabrics. Types of fiberglass fabrics are not particularly limited and may be any commercial fiberglass fabric used for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

For example, the resin composition from each embodiment of this disclosure can be used to make a resin film, which is prepared by heating and baking to semi-cure the resin composition. The resin composition may be selectively coated on a polyethylene terephthalate film (PET film), a polyimide film (PI film), a copper foil or a resin-coated copper, followed by heating and baking to semi-cure the resin composition to form the resin film.

For example, the resin composition from each embodiment of this disclosure can be used to make a laminate, which comprises two metal foils and an insulation layer disposed between the metal foils, wherein the insulation layer is made by curing the resin composition at high temperature and high pressure to the C-stage, a suitable curing temperature being for example between 150° C. and 220° C. and preferably between 200° C. and 210° C. and a suitable curing time being 90 to 180 minutes and preferably 120 to 150 minutes. The insulation layer may be formed by curing the aforesaid prepreg or resin film to the C-stage. The metal foil may comprise copper, aluminum, nickel, platinum, silver, gold or alloy thereof, such as a copper foil.

Preferably, the laminate is a copper-clad laminate (CCL).

In addition, the laminate may be further processed by trace formation processes to make a circuit board, such as a printed circuit board.

Preferably, the resin composition disclosed herein or the article made therefrom achieves improvement in one or more of the following properties: dielectric constant, dissipation factor, peel strength (e.g., copper foil peeling strength), soldering resistance, T300 thermal resistance, laminate appearance, sedimentation property, water absorption rate, and ratio of thermal expansion.

For example, the resin composition according to the present disclosure or the article made therefrom may achieve one, more or all of the following properties:

a dissipation factor as measured by reference to JIS C2565 at 10 GHz of less than or equal to 0.0040, such as less than or equal to 0.0035, or such as between 0.0032 and 0.0039 or between 0.0032 and 0.0035;

a dielectric constant as measured by reference to JIS C2565 at 10 GHz of less than or equal to 3.30, such as less than or equal to 3.24, or such as between 3.08 and 3.29 or between 3.16 and 3.24;

a copper foil peeling strength as measured by reference to IPC-TM-650 2.4.8 of greater than or equal to 3.26 lb/in, such as between 3.26 lb/in and 3.65 lb/in, between 3.26 lb/in and 3.55 lb/in or between 3.31 lb/in and 3.55 lb/in;

a water absorption rate as measured by reference to IPC-TM-650 2.6.2.1a of less than or equal to 0.15%, such as less than or equal to 0.09%, such as between 0.06% and 0.15% or between 0.06% and 0.09%;

a Z-axis ratio of thermal expansion as measured by reference to IPC-TM-650 2.4.24.5 of less than or equal to 2.66%, such as between 2.14% and 2.66%, between 2.48% and 2.66% or between 2.48% and 2.59%;

no delamination occurs after subjecting the article to a soldering resistance test of greater than or equal to 18 cycles by reference to IPC-TM-650 2.4.23, such as no delamination occurs after 20 or more cycles, such as between 20 and 30 cycles;

a time to delamination as measured by using a thermomechanical analyzer by reference to IPC-TM-650 2.4.24.1 at 300° C. of greater than or equal to 100 minutes, such as between 100 minutes and 150 minutes or between 100 minutes and 120 minutes; and no dry board on laminate surface as observed by naked eyes, such as no weave exposure on laminate surface by visual inspection.

In addition, in one embodiment, the resin composition has a sedimentation property of greater than or equal to 28 minutes, such as greater than or equal to 30 minutes, such as between 30 minutes and 60 minutes.

Raw materials below were used to prepare the resin compositions of various Examples and Comparative Examples of the present disclosure according to the amount listed in Table 1 to Table 4 and further fabricated to prepare test samples.

Materials and reagents used in Preparation Examples, Examples and Comparative Examples disclosed herein are listed below:

SA9000: methacrylate-terminated polyphenylene ether resin, available from Sabic.

OPE-2st: OPE-2st 2200, vinylbenzyl-terminated polyphenylene ether resin, available from Mitsubishi Gas Chemical Co., Inc.

SA90: hydroxyl-terminated polyphenylene ether resin, available from Sabic.
BMI-70: aromatic bismaleimide resin, available from K.I Chemical Industry Co., Ltd.
BMI-80: aromatic bismaleimide resin, available from K.I Chemical Industry Co., Ltd.
Ricon 100: styrene-butadiene copolymer, available from Cray Valley.
B-1000: polybutadiene with a 1,2-vinyl content of 85% or above and a number average molecular weight Mn of less than 2000, available from Nippon Soda Co., Ltd.
DVB: divinylbenzene, available from Nippon Steel & Sumikin Chemical.
TAIC: triallyl isocyanurate, available from Kingyorker Enterprise Co., Ltd.
DAIP: diallyl isophthalate, available from Chembridge International Corp., Ltd.
Chemically synthesized silica A: chemically synthesized spherical silica with surface treated with silane coupling agent, prepared by microemulsion and having a particle size of between 0.5 and 4.5 μm, available from Suzhou Jinyi New Materials Technology Co., Ltd.
Chemically synthesized silica B: chemically synthesized spherical silica, prepared by microemulsion and having a particle size of between 0.5 and 4.5 μm, available from Suzhou Jinyi New Materials Technology Co., Ltd.
VF-TG16: irregular silicon nitride, having a particle size of between 0.50 and 12.00 μm, available from Huzhou Jingxi Powder Material Co., Ltd.
SC-2500 SMJ: chemically synthesized silica, which is prepared by vaporized metal combustion, belonging to spherical silica treated by methacrylate silane coupling agent, available from Admatechs.
568 RCS: non-chemically synthesized silica, which is fused silica treated by silane coupling agent, available from Sibelco.
525 ARI: non-chemically synthesized silica, which is fused silica treated by silane coupling agent, available from Sibelco.
UHP-2: sheet-like boron nitride, available from Showa Denko K.K.
ALM-43: alumina (i.e., aluminum oxide, $Al_2O_3$), available from Sumitomo Chemical Co., Ltd.
CL-303: aluminum hydroxide ($Al(OH)_3$), available from Sumitomo Chemical Co., Ltd.
25B: peroxide, solid content of 100%, available from NOF Corporation.
toluene: available from Chambeco Group.
methyl ethyl ketone (MEK): source not limited.

Prepolymer Preparation Example 1

Under stirring, to 50 parts by weight of the toluene solvent were added 10 parts by weight of divinylbenzene (DVB), 10 parts by weight of triallyl isocyanurate resin (TAIC) and 5 parts by weight of diallyl isophthalate (DAIP), followed by adding 0.1 part by weight of peroxide (BPO) as the initiator, and the reaction was performed under continuous stirring at 90° C. for 3 hours; after the reaction was over, the solution was filtrated and purified and then cooled to obtain the Prepolymer 1. The overall conversion rate of DVB, TAIC and DAIP is between 10% and 90%.

Prepolymer Preparation Example 2

A prepolymer was prepared according to the processes described in the Prepolymer Preparation Example 1, except that 20 parts by weight of DVB, 10 parts by weight of TAIC and 5 parts by weight of DAIP were used to obtain the Prepolymer 2. The overall conversion rate of DVB, TAIC and DAIP is between 10% and 90%.

Prepolymer Preparation Example 3

A prepolymer was prepared according to the processes described in the Prepolymer Preparation Example 1, except that 10 parts by weight of DVB, 20 parts by weight of TAIC and 5 parts by weight of DAIP were used to obtain the Prepolymer 3. The overall conversion rate of DVB, TAIC and DAIP is between 10% and 90%.

Prepolymer Preparation Example 4

A prepolymer was prepared according to the processes described in the Prepolymer Preparation Example 1, except that 10 parts by weight of DVB, 10 parts by weight of TAIC and 15 parts by weight of DAIP were used to obtain the Prepolymer 4. The overall conversion rate of DVB, TAIC and DAIP is between 10% and 90%.

Prepolymer Preparation Example 5

A prepolymer was prepared according to the processes described in the Prepolymer Preparation Example 1, except that 15 parts by weight of DVB, 15 parts by weight of TAIC and 10 parts by weight of DAIP were used to obtain the Prepolymer 5. The overall conversion rate of DVB, TAIC and DAIP is between 10% and 90%.

Compositions of Resin Compositions of Examples and Comparative Examples are Listed Below (in Part by Weight)

TABLE 1

| | | | | | Resin compositions of Examples (in part by weight) | | | | | |
|---|---|---|---|---|---|---|---|---|---|---|
| Component | | E1 | E2 | E3 | E4 | E5 | E6 | E7 | E8 | E9 |
| vinyl-containing polyphenylene ether resin | SA9000 | 100 | 100 | 100 | 100 | 100 | 100 | 100 | 100 | 100 |
| | OPE-2st | | | | | | | | | |
| hydroxyl-containing polyphenylene ether resin | SA90 | | | | | | | | | |
| maleimide resin | BMI-70 | 5 | 5 | 5 | 5 | 5 | 5 | 5 | 5 | 5 |
| | BMI-80 | | | | | | | | | |
| polyolefin | Ricon 100 | 15 | 15 | 15 | 15 | 15 | 15 | 15 | 15 | 15 |
| | B-1000 | | | | | | | | | |
| divinylbenzene | DVB | | | | | | | | 6 | |
| triallyl compound | TAIC | | | | | | | | 6 | |
| diallyl isophthalate | DAIP | | | | | | | | 3 | |

TABLE 1-continued

Resin compositions of Examples (in part by weight)

| Component | | E1 | E2 | E3 | E4 | E5 | E6 | E7 | E8 | E9 |
|---|---|---|---|---|---|---|---|---|---|---|
| Prepolymer | Prepolymer 1 | | | | | | | | 15 | |
| | Prepolymer 2 | | | | | | | | | 15 |
| | Prepolymer 3 | | | | | | | | | |
| | Prepolymer 4 | | | | | | | | | |
| | Prepolymer 5 | | | | | | | | | |
| Chemically synthesized silica | A | 40 | 20 | 30 | 30 | 15 | 50 | 40 | 40 | 40 |
| | B | | 20 | | | | | | | |
| silicon nitride | VF-TG16 | 20 | 20 | 15 | 30 | 30 | 25 | 20 | 20 | 20 |
| chemically synthesized silica | SC-2500 SMJ | | | | | | | | | |
| fused silica | 568 RCS | | | | | | | | | |
| | 525 ARI | | | | | | | | | |
| boron nitride | UHP-2 | | | | | | | | | |
| aluminum oxide | ALM-43 | | | | | | | | | |
| aluminum hydroxide | CL-303 | | | | | | | | | |
| curing accelerator | 25B | 0.2 | 0.2 | 0.2 | 0.2 | 0.2 | 0.2 | 0.2 | 0.2 | 0.2 |
| solvent | toluene | 60 | 60 | 60 | 60 | 60 | 60 | 60 | 60 | 60 |
| | methyl ethyl ketone | 20 | 20 | 20 | 20 | 20 | 20 | 20 | 20 | 20 |

TABLE 2

Resin compositions of Examples (in part by weight)

| Component | | E10 | E11 | E12 | E13 | E14 | E15 | E16 | E17 | E18 | E19 |
|---|---|---|---|---|---|---|---|---|---|---|---|
| vinyl-containing polyphenylene ether resin | SA9000 | 100 | 100 | 100 | 100 | 50 | 100 | 100 | 100 | 100 | 100 |
| | OPE-2st | | | | | 50 | | | | | |
| hydroxyl-containing polyphenylene ether resin | SA90 | | | | | | | | | | |
| maleimide resin | BMI-70 | 5 | 5 | 2 | 10 | 5 | 5 | 5 | 5 | 5 | |
| | BMI-80 | | | | | | | | | | 5 |
| polyolefin | Ricon 100 | 15 | 15 | 20 | 20 | 15 | 15 | 15 | 15 | 15 | |
| | B-1000 | | | | | | | | | | 15 |
| divinylbenzene | DVB | | | | | | | | | | |
| triallyl compound | TAIC | | | | | | | | | | |
| diallyl isophthalate | DAIP | | | | | | | | | | |
| Prepolymer | Prepolymer 1 | 10 | 35 | 12 | 30 | 15 | | | 15 | | 15 |
| | Prepolymer 2 | | | | | | | | | | |
| | Prepolymer 3 | | | | | | 15 | | | | |
| | Prepolymer 4 | | | | | | | 15 | | | |
| | Prepolymer 5 | | | | | | | | | 15 | |
| Chemically synthesized silica | A | 40 | 40 | 30 | 35 | 40 | 40 | 40 | 40 | 40 | 40 |
| | B | | | | | | | | | | |
| silicon nitride | VF-TG16 | 20 | 20 | 15 | 25 | 20 | 20 | 20 | 20 | 20 | 20 |
| chemically synthesized silica | SC-2500 SMJ | | | | | | | | 10 | | |
| fused silica | 568 RCS | | | | | | | | | | |
| | 525 ARI | | | | | | | | | | |
| boron nitride | UHP-2 | | | | | | | | | | |
| aluminum oxide | ALM-43 | | | | | | | | | | |
| aluminum hydroxide | CL-303 | | | | | | | | | | |
| curing accelerator | 25B | 0.2 | 0.2 | 0.3 | 0.2 | 0.2 | 0.2 | 0.2 | 0.2 | 0.2 | 0.2 |
| solvent | toluene | 60 | 60 | 70 | 40 | 60 | 60 | 60 | 60 | 60 | 60 |
| | methyl ethyl ketone | 20 | 20 | 10 | 40 | 20 | 20 | 20 | 20 | 20 | 20 |

TABLE 3

Resin compositions of Comparative Examples (in part by weight)

| Component | | C1 | C2 | C3 | C4 | C5 | C6 | C7 |
|---|---|---|---|---|---|---|---|---|
| vinyl-containing polyphenylene ether resin | SA9000 | 100 | 100 | 100 | 100 | 100 | 100 | 100 |
| | OPE-2st | | | | | | | |
| hydroxyl-containing polyphenylene ether resin | SA90 | | | | | | | |

TABLE 3-continued

Resin compositions of Comparative Examples (in part by weight)

| Component | | C1 | C2 | C3 | C4 | C5 | C6 | C7 |
|---|---|---|---|---|---|---|---|---|
| maleimide resin | BMI-70 | 5 | 5 | 5 | 5 | 5 | 5 | 5 |
| | BMI-80 | | | | | | | |
| polyolefin | Ricon 100 | 15 | 15 | 15 | 15 | 15 | 15 | 15 |
| | B-1000 | | | | | | | |
| divinylbenzene | DVB | | | | | | | |
| triallyl compound | TAIC | | | | | | | |
| diallyl isophthalate | DAIP | | | | | | | |
| Prepolymer | Prepolymer 1 | | | | | | | |
| | Prepolymer 2 | | | | | | | |
| | Prepolymer 3 | | | | | | | |
| | Prepolymer 4 | | | | | | | |
| | Prepolymer 5 | | | | | | | |
| Chemically synthesized silica | A | 40 | | | 50 | 35 | 50 | 10 |
| | B | | | | | | | |
| silicon nitride | VF-TG16 | | 20 | 20 | 35 | 50 | 10 | 50 |
| chemically synthesized silica | SC-2500 SMJ | | | | | | | |
| fused silica | 568 RCS | | 40 | | | | | |
| | 525 ARI | | | 40 | | | | |
| boron nitride | UHP-2 | 20 | | | | | | |
| aluminum oxide | ALM-43 | | | | | | | |
| aluminum hydroxide | CL-303 | | | | | | | |
| curing accelerator | 25B | 0.2 | 0.2 | 0.2 | 0.2 | 0.2 | 0.2 | 0.2 |
| solvent | toluene | 60 | 60 | 60 | 60 | 60 | 60 | 60 |
| | methyl ethyl ketone | 20 | 20 | 20 | 20 | 20 | 20 | 20 |

TABLE 4

Resin compositions of Comparative Examples (in part by weight)

| Component | | C8 | C9 | C10 | C11 | C12 | C13 | C14 |
|---|---|---|---|---|---|---|---|---|
| vinyl-containing polyphenylene ether resin | SA9000 | 100 | 100 | 100 | 100 | | 100 | 100 |
| | OPE-2st | | | | | | | |
| hydroxyl-containing polyphenylene ether resin | SA90 | | | | | 100 | | |
| maleimide resin | BMI-70 | 5 | 5 | 5 | 5 | 5 | 5 | 5 |
| | BMI-80 | | | | | | | |
| polyolefin | Ricon 100 | 15 | 15 | 15 | 15 | 15 | 15 | 15 |
| | B-1000 | | | | | | | |
| divinylbenzene | DVB | | | | | | | |
| triallyl compound | TAIC | | | | | | | |
| diallyl isophthalate | DAIP | | | | | | | |
| Prepolymer | Prepolymer 1 | | | | | | | |
| | Prepolymer 2 | | | | | | | |
| | Prepolymer 3 | | | | | | | |
| | Prepolymer 4 | | | | | | | |
| | Prepolymer 5 | | | | | | | |
| Chemically synthesized silica | A | 60 | | 40 | 40 | 40 | 30 | 5 |
| | B | | | | | | | |
| silicon nitride | VF-TG16 | | 60 | | | 20 | 5 | 20 |
| chemically synthesized silica | SC-2500 SMJ | | | | | | | |
| fused silica | 568 RCS | | | | | | | |
| | 525 ARI | | | | | | | |
| boron nitride | UHP-2 | | | | | | | |
| aluminum oxide | ALM-43 | | | 20 | | | | |
| aluminum hydroxide | CL-303 | | | | 20 | | | |
| curing accelerator | 25B | 0.2 | 0.2 | 0.2 | 0.2 | 0.2 | 0.2 | 0.2 |
| solvent | toluene | 60 | 60 | 60 | 60 | 60 | 60 | 60 |
| | methyl ethyl ketone | 20 | 20 | 20 | 20 | 20 | 20 | 20 |

On the other hand, resin compositions from Table 1 to Table 4 were used to make varnishes and various samples (specimens) as described below and tested under conditions specified below.

Varnish

Components of the resin composition from each Example (abbreviated as E, such as E1 to E19) or Comparative Example (abbreviated as C, such as C1 to C14) were added to a stirrer according to the amounts listed in Tables 1-4 for stirring and well-mixing to form a resin varnish.

For example, in Example E1, 100 parts by weight of vinyl-containing polyphenylene ether resin (SA9000), 5 parts by weight of aromatic maleimide resin (BMI-70) and 15 parts by weight of polyolefin (Ricon 100) were added to a stirrer containing 60 parts by weight of toluene and 20 parts by weight of methyl ethyl ketone, and the solution was mixed and stirred to fully dissolve the solid components to form a homogeneous liquid state. Then 40 parts by weight of spherical silica (Chemically synthesized silica A) and 20 parts by weight of silicon nitride (VF-TG16) were added and well dispersed, followed by adding 0.2 part by weight of peroxide (25B, pre-dissolved by a proper amount of solvent) and stirring for 1 hour to obtain the varnish of resin composition E1.

In addition, according to the components and amounts listed in Table 1 to Table 4 above, varnishes of Examples E2 to E19 and Comparative Examples C1 to C14 were prepared following the preparation process of the varnish of Example E1.

Prepreg (Using 2116 L-Glass Fiber Fabric)

Resin compositions from different Examples (E1 to E19) and Comparative Examples (C1 to C14) listed in Table 1 to Table 4 were respectively added to a stirred tank, well mixed and fully dissolved as varnishes and then added to an impregnation tank. A fiberglass fabric (e.g., 2116 L-glass fiber fabric) was passed through the impregnation tank to adhere the resin composition on the fiberglass fabric, followed by heating at 120° C. to 150° C. to the semi-cured state (B-Stage) to obtain the prepreg (resin content of about 55%).

Copper-Clad Laminate (Obtained by Laminating Eight Prepregs)

Two 18 μm hyper very low profile (HVLP) copper foils and eight prepregs made from each resin composition (using 2116 L-glass fiber fabrics) were prepared. Each prepreg has a resin content of about 55%. A copper foil, eight prepregs and a copper foil were superimposed in such order and then subject to a vacuum condition for lamination at 200° C. for 2 hours to form each copper-clad laminate sample. Insulation layers were formed by curing (C-stage) eight sheets of superimposed prepreg between the two copper foils, and the resin content of the insulation layers was about 55%.

Copper-Free Laminate (Obtained by Laminating Eight Prepregs)

Each copper-clad laminate obtained by laminating eight prepregs was etched to remove the two copper foils to obtain a copper-free laminate made from laminating eight prepregs and having a resin content of about 55%.

Copper-Free Laminate (Obtained by Laminating Two Prepregs)

Two 18 μm hyper very low profile (HVLP) copper foils and two prepregs made from each resin composition (using 2116 L-glass fiber fabrics) were prepared. Each prepreg has a resin content of about 55%. A copper foil, two prepregs and a copper foil were superimposed in such order and then subject to a vacuum condition for lamination at 200° C. for 2 hours to form each copper-clad laminate, which was then subject to an etching process to remove the copper foils on both sides to obtain a copper-free laminate sample (obtained by laminating two prepregs). Insulation layers were formed by curing (C-stage) two sheets of superimposed prepreg between the two copper foils, and the resin content of the insulation layers was about 55%.

Test items and test methods are described below.

1. Dielectric Constant (Dk) and Dissipation Factor (Df)

In the measurement of dielectric constant and dissipation factor, a copper-free laminate sample (obtained by laminating two prepregs) was tested by using a microwave dielectrometer available from AET Corp. by reference to JIS C2565 at 10 GHz for analyzing each sample. Lower dielectric constant or lower dissipation factor represents better dielectric properties of the sample.

Under a 10 GHz frequency, for a Dk value of less than or equal to 3.60 and a Df value of less than or equal to 0.005, a difference in Dk value of greater than or equal to 0.05 represents substantial difference (i.e., significant technical difficulty) in dielectric constant of different laminates, and a difference in Dk value of less than 0.05 represents no substantial difference in dielectric constant of different laminates; under a 10 GHz frequency, for a Dk value of less than or equal to 3.60 and a Df value of less than or equal to 0.005, a difference in Df value of less than 0.0001 represents no substantial difference in dissipation factor of different laminates, and a difference in Df value of greater than or equal to 0.0001 represents a substantial difference (i.e., significant technical difficulty) in dissipation factor of different laminates.

For example, as measured by reference to JIS C2565 at 10 GHz, articles made from the resin composition disclosed herein are characterized by a dielectric constant of less than or equal to 3.30 such as less than or equal to 3.24 and a dissipation factor of less than or equal to 0.0040 such as less than or equal to 0.0035.

2. Copper Foil Peeling Strength (Peel Strength, P/S)

A copper-clad laminate (obtained by laminating eight prepregs) was cut into a rectangular specimen with a width of 24 mm and a length of greater than 60 mm, which was then etched to remove surface copper foil and leave a rectangular copper foil with a width of 3.18 mm and a length of greater than 60 mm. The specimen was tested by using a tensile strength tester by reference to IPC-TM-650 2.4.8 at ambient temperature (about 25° C.) to measure the force (lb/in) required to pull off the copper foil from the laminate surface. A higher copper foil peeling strength is more preferred, and a difference in copper foil peeling strength of greater than or equal to 0.1 lb/in represents a significant difference.

For example, articles made from the resin composition disclosed herein have a copper foil peeling strength as measured by reference to IPC-TM-650 2.4.8 of greater than or equal to 3.26 lb/in, preferably greater than or equal to 3.26 lb/in, 3.31 lb/in, 3.43 lb/in, 3.45 lb/in, 3.46 lb/in, 3.49 lb/in, 3.51 lb/in, 3.53 lb/in, 3.55 lb/in, 3.58 lb/in or 3.65 lb/in, such as between 3.26 lb/in and 3.65 lb/in, between 3.26 lb/in and 3.55 lb/in, or between 3.31 lb/in and 3.55 lb/in.

3. Soldering Resistance (Solder Dipping Test, S/D)

In the soldering resistance test, by reference to IPC-TM-650 2.4.23 (Soldering Resistance of Laminate Materials), the copper-clad laminate (obtained by laminating eight prepregs) specimen was immersed in a 288° C. solder bath for 10 seconds as one cycle, removed and placed under room temperature for about 10 seconds, and then immersed in the solder bath for 10 seconds, removed and placed under room temperature for about 10 seconds. The processes were repeated to measure the total cycles before the specimen occurs delamination. If no delamination was observed after 20 cycles, a designation of ">20" was given. In general, greater number of total cycles before delamination in the soldering resistance test indicates that the article made from the resin composition (e.g., copper-clad laminate) has better thermal resistance.

For example, by reference to IPC-TM-650 2.4.23, no delamination occurs after subjecting the articles made from the resin composition disclosed herein to a soldering resistance test of greater than or equal to 18 cycles, such as no delamination occurs after 20 or more cycles, such as between 20 and 30 cycles.

4. T300 Thermal Resistance

A copper-clad laminate sample (obtained by laminating eight prepregs, 6.5 mm*6.5 mm in size) was used in the T300 thermal resistance test. At a constant temperature of 300° C., a thermal mechanical analyzer (TMA) was used by reference to IPC-TM-650 2.4.24.1 to test each sample and record the time to delamination (e.g., blistering) of the copper-clad laminate. Longer time to delamination represents better thermal resistance of the copper-clad laminate made from the resin composition. If no delamination was observed after 100 minutes of testing, a designation of ">100" was given.

For example, articles made from the resin composition disclosed herein are characterized by a time to delamination as measured by using a thermal mechanical analyzer by reference to IPC-TM-650 2.4.24.1 of greater than or equal to 100 minutes, such as between 100 minutes and 150 minutes, such as between 100 minutes and 120 minutes.

5. Laminate Appearance

Figure 1:
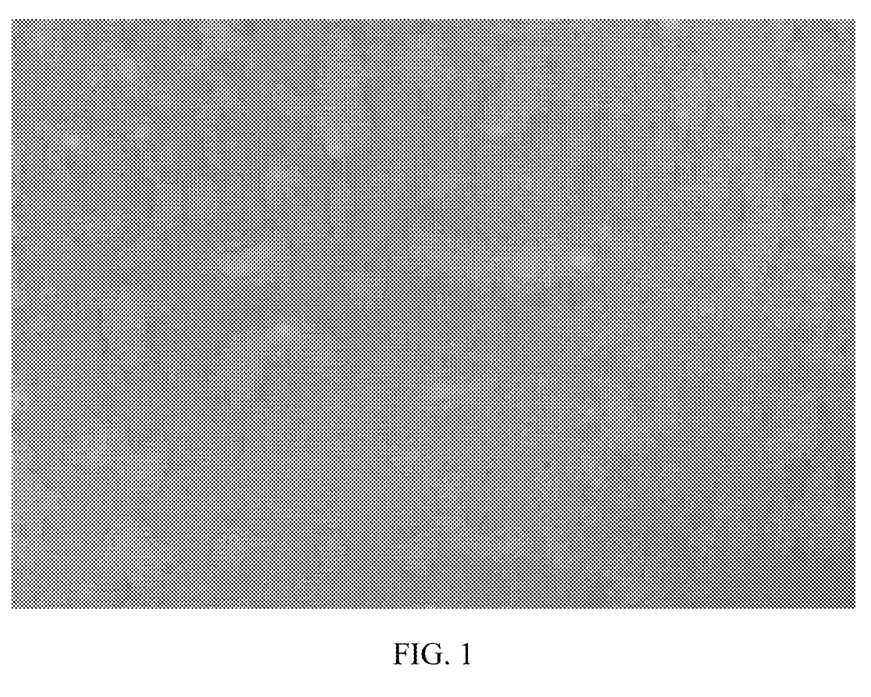
FIG. 1 illustrates a copper-free laminate having a surface with weave exposure (i.e., dry board).
Figure 2:
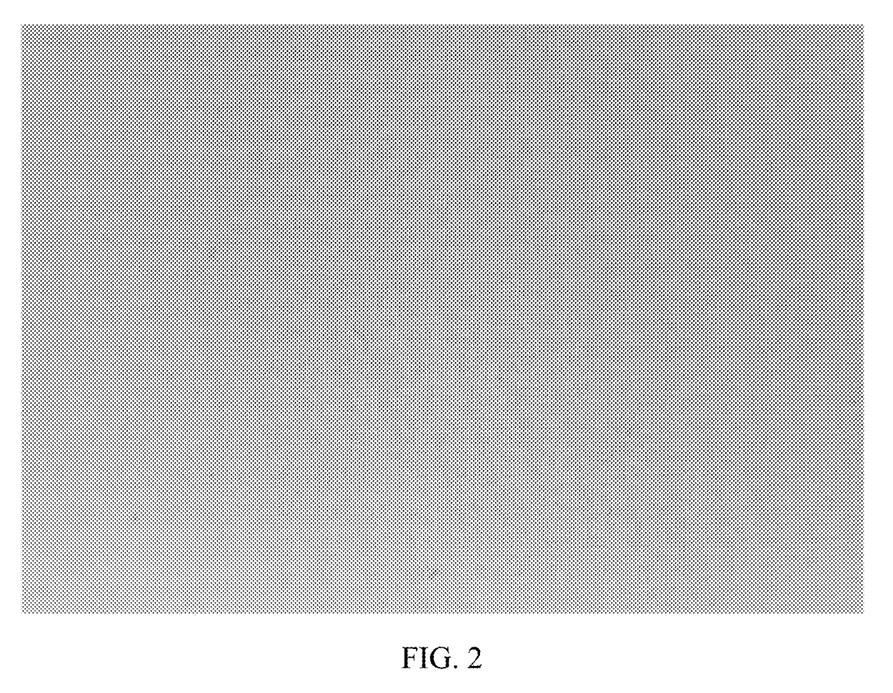
FIG. 2 illustrates a copper-free laminate having a normal surface appearance.

A 9 inch*12 inch copper-free laminate sample (obtained by laminating eight prepregs) was examined by visual inspection with naked eyes to observe its surface appearance. The presence of at least one weave exposure of 1*1 $cm^2$ or greater on the surface of the copper-free laminate is determined as dry board and designated as "weave exposure", as illustrated in FIG. 1. If the laminate has a smooth surface, it is determined as no dry board and designated as "normal", as illustrated in FIG. 2. As understood by a skilled person in this field, dry board means that the laminate is not suitable for subsequent processes for making a multi-layer board or a circuit board.

For example, articles made from the resin composition disclosed herein are characterized by normal laminate surface appearance, such as no weave exposure on the insulation layer surface of a copper-free laminate.

6. Sedimentation Property

In the sedimentation property test, the aforesaid each resin varnish sample was poured into a round bottom jar with a diameter of 6 cm until the volume reached to a height of 8 cm. The sample was stirred at 600 rpm for 40 minutes, such that the viscosity measured by using a ψ3 mm Zahn cup (available from Chuan Hua Corporation) was about 30-35 seconds; then the sample was placed and stood still at room temperature of about 25° C., and the progress of resin sedimentation at the bottom of the container was observed. The time (minute) to the formation of 1 cm height resin sedimentation at the bottom of the container was recorded. If the sedimentation time is greater than 30 minutes, a designation of ">30" was given. As understood by a skilled person in this field, fast sedimentation of the varnish indicates that fillers in the varnish settles too fast, which may cause non-uniform content distribution of fillers in the prepreg and lead to unstable quality and deteriorate product properties; therefore, longer sedimentation time represents higher stability of the resin composition.

For example, articles made from the resin composition disclosed herein are characterized by a sedimentation time as measured above of greater than or equal to 28 minutes, such as greater than or equal to 30 minutes, such as between 30 minutes and 60 minutes.

7. Water Absorption Rate

In the water absorption rate test, by reference to IPC-TM-650 2.6.2.1a, a 2 inch*2 inch copper-free laminate sample obtained by laminating eight prepregs was placed in a 105±10° C. oven and baked for 1 hour, then cooled at room temperature of about 25° C. for 10 minutes and weighed to give a weight value W1 representing the weight of the copper-free laminate; then the copper-free laminate sample was immersed and soaked in pure water at room temperature for 24 hours, then removed from the pure water and wiped to remove residual water on the surface, and the sample was weighed again to give a weight value W2 representing the weight of the copper-free laminate after water absorption. The water absorption rate W (%) was calculated as follow:

$$W (\%)=((W2-W1)/W1)*100\%.$$

For example, articles made from the resin composition disclosed herein have a water absorption rate as measured by reference to IPC-TM-650 2.6.2.1a of less than or equal to 0.15%, preferably about 0.06%, 0.07%, 0.08%, 0.09%, 0.12%, 0.13%, 0.14%, or 0.15%, such as between 0.06% and 0.15% or between 0.06% and 0.09%.

8. Ratio of Thermal Expansion

A copper-free laminate sample obtained by laminating eight prepregs was subject to thermal mechanical analysis (TMA) during the measurement of the ratio of thermal expansion (i.e., ratio of dimensional change). Each sample was heated from 35° C. to 265° C. at a temperature increase rate of 10° C./minute and then subject to the measurement of dimensional change (%) between 50° C. and 260° C. in Z-axis by reference to the method described in IPC-TM-650 2.4.24.5, wherein lower dimensional change percentage is more preferred.

In general, high ratio of thermal expansion in Z-axis indicates high ratio of dimensional change, and copper-clad laminates with high ratio of dimensional change may result in reliability problems such as delamination during printed circuit board fabrication. In the present technical field, lower ratio of thermal expansion is more preferred, and a difference in ratio of thermal expansion of greater than or equal to 0.1% represents a substantial difference (i.e., significant technical difficulty).

For example, articles made from the resin composition disclosed herein have a ratio of thermal expansion as measured above of less than or equal to 2.66%, such as between 2.14% and 2.66%, between 2.48% and 2.66% or between 2.48% and 2.59%.

Results of the aforesaid tests of Examples and Comparative Examples are listed below.

TABLE 5

Test results of resin compositions and articles of Examples

| Item | Unit | E1 | E2 | E3 | E4 | E5 | E6 | E7 | E8 | E9 |
|---|---|---|---|---|---|---|---|---|---|---|
| dielectric constant | none | 3.25 | 3.08 | 3.18 | 3.26 | 3.24 | 3.29 | 3.19 | 3.18 | 3.16 |
| dissipation factor | none | 0.0038 | 0.0038 | 0.0039 | 0.0037 | 0.0037 | 0.0039 | 0.0037 | 0.0032 | 0.0032 |
| copper foil peeling strength | lb/in | 3.58 | 3.45 | 3.65 | 3.43 | 3.49 | 3.43 | 3.26 | 3.49 | 3.51 |
| soldering resistance | cycle | >20 | >20 | >20 | >20 | >20 | >20 | >20 | >20 | >20 |
| T300 | minute | >100 | >100 | >100 | >100 | >100 | >100 | >100 | >100 | >100 |

TABLE 5-continued

Test results of resin compositions and articles of Examples

| Item | Unit | E1 | E2 | E3 | E4 | E5 | E6 | E7 | E8 | E9 |
|---|---|---|---|---|---|---|---|---|---|---|
| laminate appearance | none | normal | normal | normal | normal | normal | normal | normal | normal | normal |
| sedimentation property | minute | >30 | >30 | >30 | >30 | >30 | 28 | >30 | >30 | >30 |
| water absorption rate | % | 0.13 | 0.12 | 0.15 | 0.14 | 0.15 | 0.13 | 0.14 | 0.07 | 0.06 |
| ratio of thermal expansion | % | 2.25 | 2.25 | 2.34 | 2.24 | 2.33 | 2.14 | 2.63 | 2.56 | 2.54 |

TABLE 6

Test results of resin compositions and articles of Examples

| Item | Unit | E10 | E11 | E12 | E13 | E14 | E15 | E16 | E17 | E18 | E19 |
|---|---|---|---|---|---|---|---|---|---|---|---|
| dielectric constant | none | 3.20 | 3.23 | 3.17 | 3.24 | 3.16 | 3.19 | 3.17 | 3.24 | 3.18 | 3.20 |
| dissipation factor | none | 0.0035 | 0.0032 | 0.0035 | 0.0032 | 0.0035 | 0.0034 | 0.0032 | 0.0034 | 0.0033 | 0.0033 |
| copper foil peeling strength | lb/in | 3.53 | 3.26 | 3.46 | 3.31 | 3.55 | 3.52 | 3.45 | 3.42 | 3.48 | 3.34 |
| soldering resistance | cycle | >20 | 18 | >20 | >20 | >20 | >20 | >20 | >20 | >20 | >20 |
| T300 | minute | >100 | >100 | >100 | >100 | >100 | >100 | >100 | >100 | >100 | >100 |
| laminate appearance | none | normal | normal | normal | normal | normal | normal | normal | normal | normal | normal |
| sedimentation property | minute | >30 | >30 | >30 | >30 | >30 | >30 | >30 | >30 | >30 | >30 |
| water absorption rate | % | 0.09 | 0.08 | 0.08 | 0.07 | 0.07 | 0.08 | 0.07 | 0.07 | 0.08 | 0.07 |
| ratio of thermal expansion | % | 2.49 | 2.66 | 2.58 | 2.59 | 2.52 | 2.55 | 2.51 | 2.49 | 2.49 | 2.48 |

TABLE 7

Test results of resin compositions and articles of Comparative Examples

| Item | Unit | C1 | C2 | C3 | C4 | C5 | C6 | C7 |
|---|---|---|---|---|---|---|---|---|
| dielectric constant | none | 3.21 | 3.36 | 3.35 | 3.36 | 3.42 | 3.24 | 3.37 |
| dissipation factor | none | 0.0037 | 0.0055 | 0.0053 | 0.0039 | 0.0037 | 0.0039 | 0.0037 |
| copper foil peeling strength | lb/in | 3.12 | 3.12 | 3.11 | 3.15 | 3.05 | 3.52 | 3.15 |
| soldering resistance | cycle | 3 | >20 | >20 | >20 | >20 | >20 | >20 |
| T300 | minute | 29 | 85 | 88 | >100 | >100 | >100 | >100 |
| laminate appearance | none | weave exposure | weave exposure | weave exposure | normal | normal | normal | normal |
| sedimentation property | minute | 11 | >30 | >30 | 8 | >30 | 15 | >30 |
| water absorption rate | % | 0.14 | 0.13 | 0.15 | 0.12 | 0.12 | 0.13 | 0.12 |
| ratio of thermal expansion | % | 2.31 | 2.23 | 2.22 | 2.13 | 2.15 | 2.25 | 2.25 |

TABLE 8

Test results of resin compositions and articles of Comparative Examples

| Item | Unit | C8 | C9 | C10 | C11 | C12 | C13 | C14 |
|---|---|---|---|---|---|---|---|---|
| dielectric constant | none | 3.20 | 3.39 | 3.61 | 3.51 | 3.36 | 3.03 | 3.00 |
| dissipation factor | none | 0.0041 | 0.0037 | 0.0045 | 0.0047 | 0.0051 | 0.0033 | 0.0032 |
| copper foil peeling strength | lb/in | 3.55 | 3.09 | 3.48 | 3.42 | 3.41 | 3.62 | 3.68 |
| soldering resistance | cycle | >20 | >20 | >20 | 8 | >20 | >20 | >20 |
| T300 | minute | >100 | >100 | >100 | 77 | >100 | >100 | >100 |
| laminate appearance | none | normal | normal | normal | normal | normal | normal | normal |
| sedimentation property | minute | 10 | >30 | >30 | >30 | >30 | >30 | >30 |

TABLE 8-continued

Test results of resin compositions and articles of Comparative Examples

| Item | Unit | C8 | C9 | C10 | C11 | C12 | C13 | C14 |
|---|---|---|---|---|---|---|---|---|
| water absorption rate | % | 0.13 | 0.14 | 0.13 | 0.22 | 0.26 | 0.14 | 0.14 |
| ratio of thermal expansion | % | 2.24 | 2.24 | 2.33 | 2.34 | 2.29 | 2.86 | 2.95 |

The following observations can be made according to the test results above.

Side-by-side comparison of Examples E1-E19 and Comparative Examples C1-C3, C10 and C11 indicates that by using an inorganic filler combination containing chemically synthesized silica and silicon nitride according to the present disclosure, in contrast to Comparative Examples using other inorganic filler combinations, laminates made from the present disclosure may achieve at the same time one, more or all of the following technical effects: lower dielectric constant, lower dissipation factor, higher copper foil peeling strength, higher soldering resistance, higher T300 thermal resistance, normal laminate appearance, and lower ratio of thermal expansion.

Side-by-side comparison of Examples E1-E19 and Comparative Examples C4 and C5 indicates that, relative to 100 parts by weight of the vinyl-containing polyphenylene ether resin, if the total amount of chemically synthesized silica and silicon nitride in the inorganic filler combination is between 45 parts by weight and 75 parts by weight, in contrast to a total amount of greater than 75 parts by weight of the inorganic filler combination in the Comparative Examples, laminates made from the present disclosure may achieve significantly lower dielectric constant and significantly higher copper foil peeling strength.

Side-by-side comparison of Examples E1-E19 and Comparative Examples C6-C9 indicates that, if the weight ratio of chemically synthesized silica and silicon nitride is between 1:2 and 5:2, in contrast to a weight ratio of chemically synthesized silica and silicon nitride not within the range of 1:2 to 5:2 of the Comparative Examples, laminates made from the present disclosure may achieve at the same time one, more or all of the following technical effects: lower dielectric constant, higher copper foil peeling strength, and better sedimentation property.

Side-by-side comparison of Examples E1-E19 and Comparative Examples C1-C14 confirms that laminates made from the technical solution according to the present disclosure may achieve at the same time one, more or all of the following technical effects: dielectric constant of less than or equal to 3.30, dissipation factor of less than or equal to 0.0040, copper foil peeling strength of greater than or equal to 3.26 lb/in, sedimentation time of greater than or equal to 28 minutes, Z-axis ratio of thermal expansion of less than or equal to 2.66%, and water absorption rate of less than or equal to 0.15%. In contrast, Comparative Examples C1-C14 not using the technical solution of the present disclosure fail to achieve the aforesaid technical effects.

In addition, compared with Examples E1-E7 and Comparative Examples C1-C14, it is observed that laminates made from Examples E8-E19 may further achieve a water absorption rate of less than or equal to 0.09%. In contrast, Examples E1-E7 and Comparative Examples C1-C14 fail to achieve the aforesaid technical effects.

The above detailed description is merely illustrative in nature and is not intended to limit the embodiments of the subject matter or the application and uses of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and all foreseeable equivalents at the time of filing this patent application.

What is claimed is:

1. A resin composition, comprising:
   100 parts by weight of a vinyl-containing polyphenylene ether resin; and
   45 parts by weight to 75 parts by weight of an inorganic filler combination, the inorganic filler combination at least comprising chemically synthesized silica and silicon nitride, wherein a weight ratio of the chemically synthesized silica and the silicon nitride is between 1:2 and 5:2, wherein:
   the vinyl-containing polyphenylene ether resin comprises a vinylbenzyl-containing polyphenylene ether resin, a methacrylate-containing polyphenylene ether resin or a combination thereof;
   the chemically synthesized silica comprises spherical silica having a particle size of between 0.5 and 4.5 μm;
   the chemically synthesized silica comprises microemulsion synthesized silica, vaporized metal combustion synthesized silica or a combination thereof; and
   the silicon nitride comprises irregular silicon nitride having a particle size of between 0.5 and 12 μm.

2. The resin composition of claim 1, wherein the resin composition further comprises an additive combination or a prepolymer thereof, and the additive combination at least comprises divinylbenzene, triallyl compound and diallyl isophthalate.

3. The resin composition of claim 2, wherein the divinylbenzene, the triallyl compound and the diallyl isophthalate are present in a weight ratio of 10-20:10-20:5-15.

4. The resin composition of claim 2, comprising 10 to 35 parts by weight of the additive combination or the prepolymer thereof relative to 100 parts by weight of the vinyl-containing polyphenylene ether resin.

5. The resin composition of claim 2, comprising 10 to 30 parts by weight of the prepolymer of the additive combination relative to 100 parts by weight of the vinyl-containing polyphenylene ether resin.

6. The resin composition of claim 2, wherein the additive combination further comprises maleimide resin, styrene maleic anhydride, 1,2,4-trivinyl cyclohexane, styrene, polyolefin, epoxy resin, cyanate ester resin, maleimide triazine resin, phenolic resin, benzoxazine resin, polyester resin, amine curing agent or a combination thereof.

7. The resin composition of claim 1, further comprising divinylbenzene, triallyl compound, di(vinylphenyl)ethane, di(vinylphenyl)hexane, diallyl isophthalate, bis(vinylphenyl) dimethyl ether, bis(vinylphenyl) dimethyl benzene, maleimide resin, polyolefin resin, cyanate ester resin, maleimide triazine resin, epoxy resin, phenolic resin, benzoxazine resin, styrene maleic anhydride resin, polyester resin, amine curing agent, polyamide resin, polyimide resin or a combination thereof.

8. The resin composition of claim 1, further comprising filler, flame retardant, curing accelerator, polymerization inhibitor, coloring agent, toughening agent, silane coupling agent, solvent or a combination thereof.

9. The resin composition of claim 1, having a sedimentation property of greater than or equal to 28 minutes.

10. An article made from the resin composition of claim 1, wherein the article comprises a prepreg, a resin film, a laminate, or a printed circuit board.

11. The article of claim 10, having a dissipation factor at 10 GHz as measured by reference to JIS C2565 of less than or equal to 0.0040.

12. The article of claim 10, having a dielectric constant at 10 GHz as measured by reference to JIS C2565 of less than or equal to 3.30.

13. The article of claim 10, having a copper foil peeling strength as measured by reference to IPC-TM-650 2.4.8 of greater than or equal to 3.26 lb/in.

14. The article of claim 10, having a water absorption rate as measured by reference to IPC-TM-650 2.6.2.1a of less than or equal to 0.15%.

15. The article of claim 10, having a Z-axis ratio of thermal expansion as measured by reference to IPC-TM-650 2.4.24.5 of less than or equal to 2.66%.

* * * * *